United States Patent [19]
Tsuji et al.

[11] Patent Number: 5,477,938
[45] Date of Patent: Dec. 26, 1995

[54] POWER PLANT SUPPORTING STRUCTURE OF AUTOMOTIVE VEHICLE

[75] Inventors: Seiichi Tsuji, Yokohama; Yoshikazu Ide; Mitsuru Fujinaka, both of Hiroshima; Masayoshi Sannomiya, Yokohama, all of Japan

[73] Assignee: Mazda Motor Corporation, Hiroshima, Japan

[21] Appl. No.: 318,453

[22] Filed: Oct. 5, 1994

Related U.S. Application Data

[63] Continuation of Ser. No. 221,540, Apr. 1, 1994, Pat. No. 5,372,216, which is a continuation of Ser. No. 772,092, Oct. 8, 1991, abandoned.

[30] Foreign Application Priority Data

| Oct. 8, 1990 | [JP] | Japan | 2-271506 |
| Nov. 30, 1990 | [JP] | Japan | 2-339563 |
| Jun. 29, 1991 | [JP] | Japan | 3-185312 |

[51] Int. Cl.$^6$ ................................ B60K 28/14
[52] U.S. Cl. ............... 180/274; 180/297; 280/784; 296/189; 188/371
[58] Field of Search ............ 280/784; 180/274, 180/297, 312, 902, 294, 298; 188/371; 293/133; 296/188, 189

[56] References Cited

U.S. PATENT DOCUMENTS

| 3,869,017 | 3/1975 | Feustel et al. | 280/784 X |
| 3,896,896 | 7/1975 | Saitoh | 280/784 |
| 4,428,599 | 1/1984 | Jahnle | 280/784 |
| 4,449,603 | 5/1984 | Langwieder et al. | 280/784 X |
| 4,684,151 | 8/1987 | Drewek | 280/784 |
| 4,763,948 | 8/1988 | Harasaki | 296/194 |
| 4,899,843 | 2/1990 | Takano et al. | 180/312 |
| 5,033,593 | 7/1991 | Kazuhito | 188/377 |
| 5,040,646 | 8/1991 | Drefahl | 188/371 |
| 5,076,389 | 12/1991 | Goor | 280/784 X |
| 5,100,189 | 3/1992 | Futamata et al. | 293/132 |
| 5,188,160 | 6/1992 | Kitagawa et al. | 296/189 |
| 5,372,216 | 12/1994 | Tsuji et al. | 180/274 |

FOREIGN PATENT DOCUMENTS

| 3219422 | 9/1980 | Japan | 180/297 |
| 58-89475 | 5/1983 | Japan . | |
| 60-40839 | 3/1985 | Japan . | |
| 60-40836 | 3/1985 | Japan . | |
| 62-92922 | 4/1987 | Japan . | |
| 64-34329 | 3/1989 | Japan . | |
| 1-215624 | 8/1989 | Japan . | |
| 2-38221 | 3/1990 | Japan . | |
| 1600973 | 10/1990 | U.S.S.R. | 180/297 |

*Primary Examiner*—Brian L. Johnson
*Attorney, Agent, or Firm*—Keck, Mahin & Cate

[57] ABSTRACT

A power plant support structure for supporting a power plant of a vehicle includes a center frame extending in a lengthwise direction of the car body. The center frame is connected, at its lengthwise ends, to front and rear cross members, disposed forward and rearward of the power plant and extending between front side frames. A front mount is secured to the center frame before the power plant and connects the power plant to the center frame. The center frame absorbs an impact exerted on the power plant during a front-end collision of the vehicle.

7 Claims, 14 Drawing Sheets

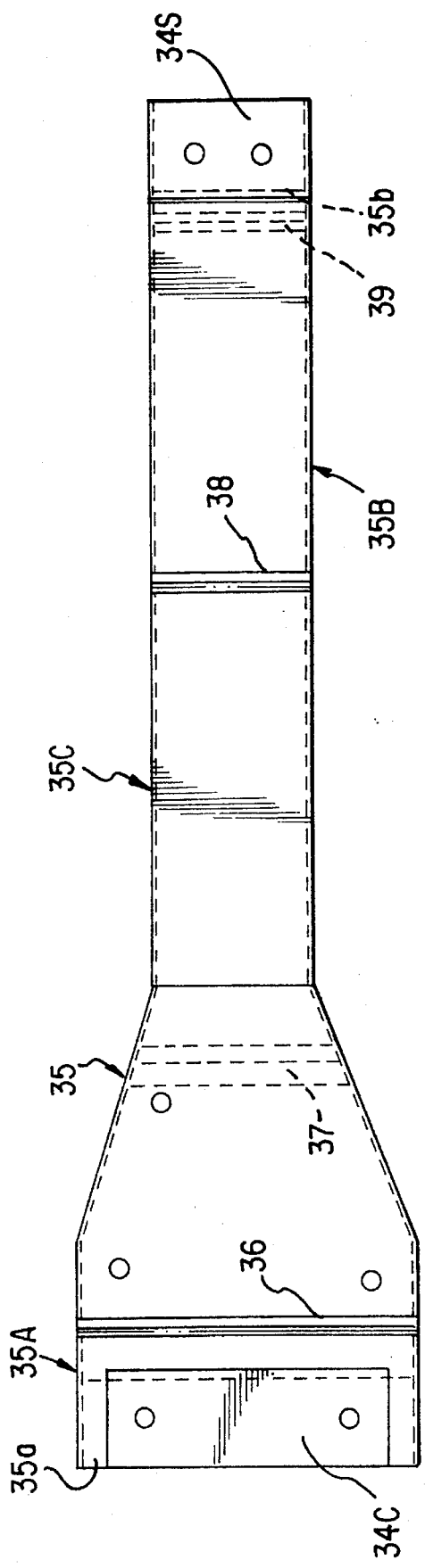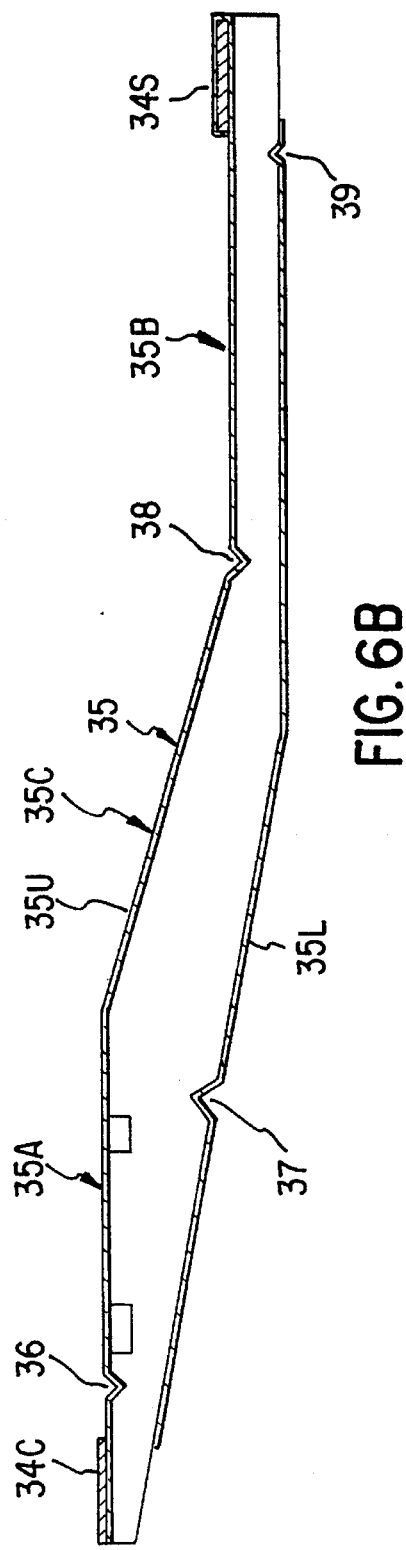
FIG. 6A
FIG. 6B

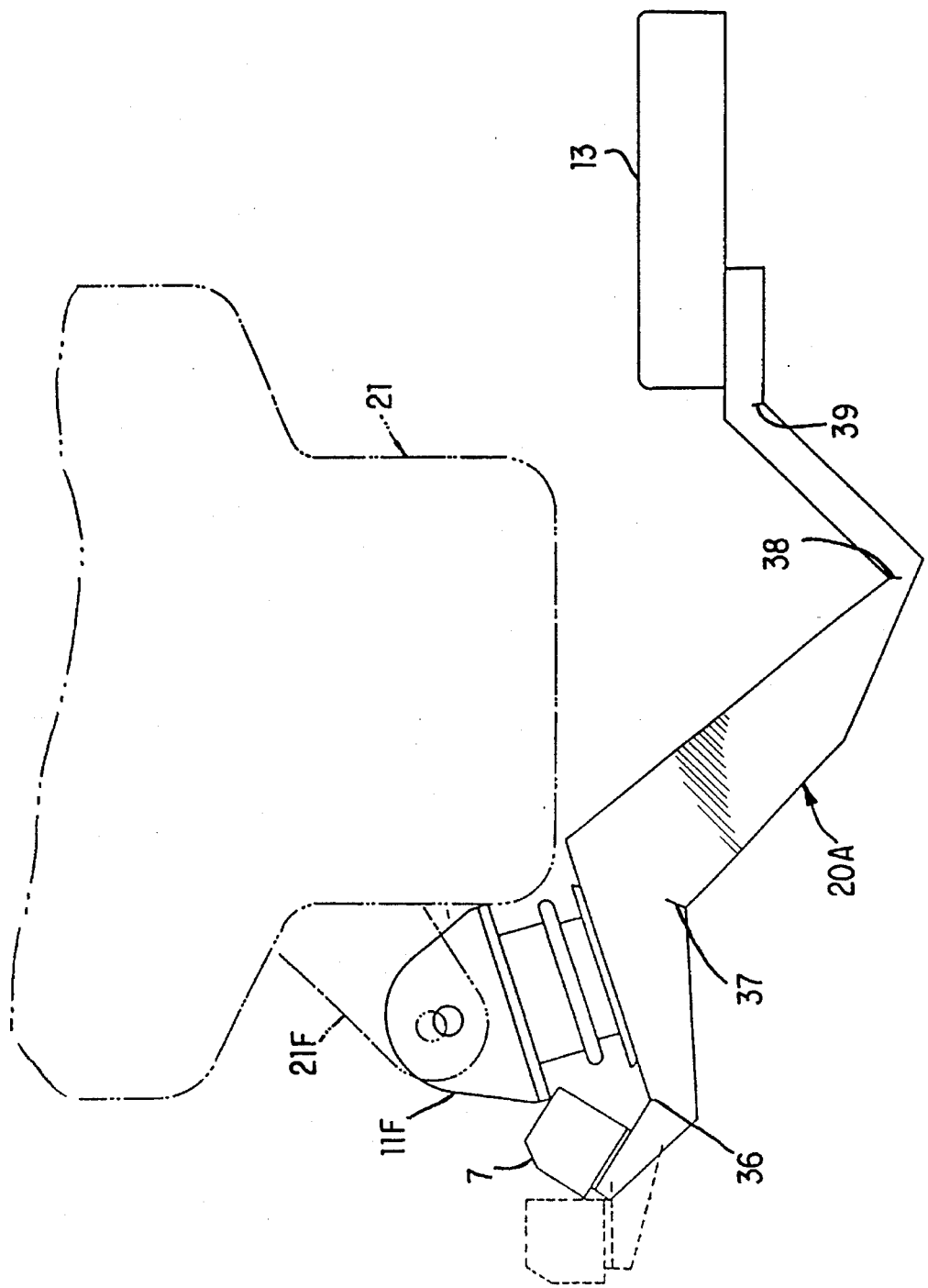

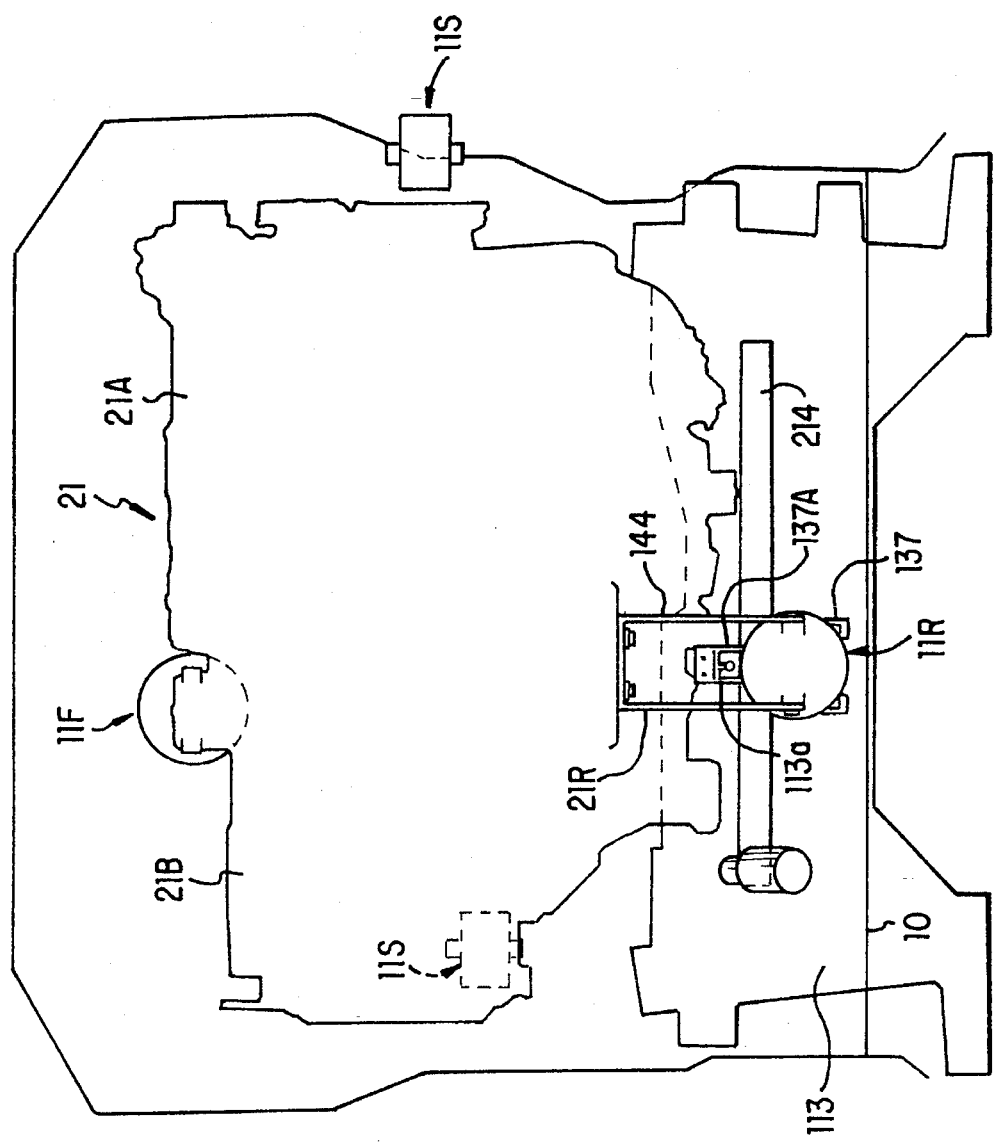

1

POWER PLANT SUPPORTING STRUCTURE OF AUTOMOTIVE VEHICLE

This is a continuation of application Ser. No. 08/221,540, filed Apr. 1, 1994, now U.S. Pat. No. 5,372,216 which is a continuation of application Ser. No. 07/772,092, filed Oct. 8, 1991, abandoned.

The present invention relates to part of the body structure of an automotive vehicle and, more particularly, to the front body structure of a car body in which a power plant is installed.

BACKGROUND OF THE INVENTION

1. Field of the Invention

Typically, a power plant of an automotive vehicle, including an engine and a transmission, is supported at a plurality of points by a power plant supporting structure. As is shown in FIG. 1, which illustrates a known power plant supporting structure, a power plant 21 is conventionally mounted at one point on a center beam or frame 101 of a front body structure by means such as a mount 105. The center frame 101 extends in a lengthwise direction and from the front to the back of the car body between a front cross member 102 and a suspension cross member 103, forming a part of a lower dash panel. Both of the cross members 102 and 103 extend transversely relative to the center frame 101.

2. Description of Related Art

A power plant support structure such as that described above is known from, for example, Japanese Unexamined Utility Model No. 2-38,221. In such a support structure, during a front-end collision, the center beam 101 is deformed at its mid-portion, as shown by a chained line in FIG. 1. The cross member 102 and the mount 105, therefore, are forced rearward without deformation, and the support structure for the power plant 21 is unable to absorb an impact exerted on the power plant 21 during the front-end collision. Hence, the mount 105 collides against the power plant 21, as a result of a deformation of the center frame 101, and pushes the power plant 21 rearward. The amount of rearward displacement allowed for the mount 105 depends on what is called a "crush distance" or "crash-space," which is defined by a lengthwise direction D between the power plant 21 and the mount 105. Providing a small crash space in the power plant support structure is desirable in order to provide a compact engine room. However, providing such a small crash space also causes a large lengthwise movement of the power plant 21 during a front-end collision. The power plant, therefore, may possibly damage structural members of the passenger room and consequently injure occupants of the passenger room.

Another typical power plant support structure is disclosed by Japanese Unexamined Utility Model No. 60-40,836 and is shown in FIG. 2A. In this prior art power plant support structure, the power plant 21 is mounted at several points on a cross member 212 of a front body structure by mount assemblies 220. The mount assembly 220, to which the power plant 21 is secured through a bracket 206, comprises a mount member 222 and an adapter member 224. The adapter member 224 has legs 224a and 224b welded or otherwise secured to front and rear posts of walls 212a and 212b of the cross member 212. The mount member 222 is welded or otherwise secured to the adapter member 224. A steering rack 214 extends in the transverse direction over the cross member 212.

Such a mount assembly 220 is designed to make the legs 224a and 224b of the adapter member 224 short in length so as to increase the rigidity of the power plant support structure. In fact, as shown in FIG. 2B, upon, for instance, a front-end collision, the power plant 21 is forced or displaced rearward. Hence, the power plant 21 crashes against the steering rack 214 and, as a result, displaces the steering rack 214 rearward. Such a rearward displacement of the steering rack is, however, restricted by the rear wall 212b, projecting from the cross member 212. The amount of rearward displacement allowed for the steering rack 214 depends on the "crash-space," defined by a lengthwise direction D between the steering rack 214 and the rear wall 212b of the cross member 212. To adequately absorb an impact against the power plant when a front-end collision occurs, the power plant support structure must be improved to provide a sufficient crash space.

SUMMARY OF THE INVENTION

It is a primary object of the present invention to provide a power plant support structure which has a substantially increased crash space.

The above object is accomplished by providing a power plant support structure installed in a front body section of a car body for supporting a power plant of a vehicle. The power plant support structure comprises a center frame extending in a lengthwise direction of the car body from the front to the back of the car body. The center frame extends between and is connected, at its lengthwise ends, to front and rear cross members disposed forward and rearward, respectively, of the power plant. The center frame further extends between front side frames. A rear cross member is disposed rearward of the power plant and extends between the front side frames, disposed on opposite sides of the front body section. Front mount means is secured to the center frame before the power plant and connects the power plant to the center frame. The center frame is provided with crash space forming means for absorbing an impact exerted on the power plant upon a front-end collision of the vehicle.

The crash space forming means may take various forms which allow the center frame to crash, in the lengthwise direction, in a particularly intended pattern upon a front-end collision of the vehicle.

According to a specific embodiment of the present invention, the crash space forming means comprises a plurality of convex grooves which are formed in the center frames. Every other one of the grooves is arranged in one and the same wall of the center frame.

According to another specific embodiment of the present invention, the crash space forming means is an impact absorbing means, provided between the center frame and the rear cross member and deformable in the lengthwise direction upon a front-end collision of the vehicle, for absorbing an impact exerted on the rear cross member by the center frame.

Otherwise, the crash space forming means may be provided between the rear cross member and the power plant so as to allow the power plant to displace rearward upon a front-end collision of the vehicle.

BRIEF DESCRIPTION OF THE DRAWINGS

The above and other objects and various other features of the present invention will be apparent to those skilled in the art from the following description of preferred embodiments thereof when considered together with the drawings. Similar parts are designated by the same or similar reference numerals throughout the drawings, in which:

FIGS. 6A and 6B are, respectively, a plan view and a cross-sectional view of a center frame of the power plant support structure shown in FIG. 5;

FIG. 7 is a schematic illustration of the center frame of the power plant support structure shown in FIG. 5 which has been crushed due to a front-end collision of the vehicle;

FIGS. 18A and 18B are illustrations of connection details between the power plant support structure and the power plant.

DETAILED DESCRIPTION OF THE PREFERRED EMBODIMENTS

Figure 1:
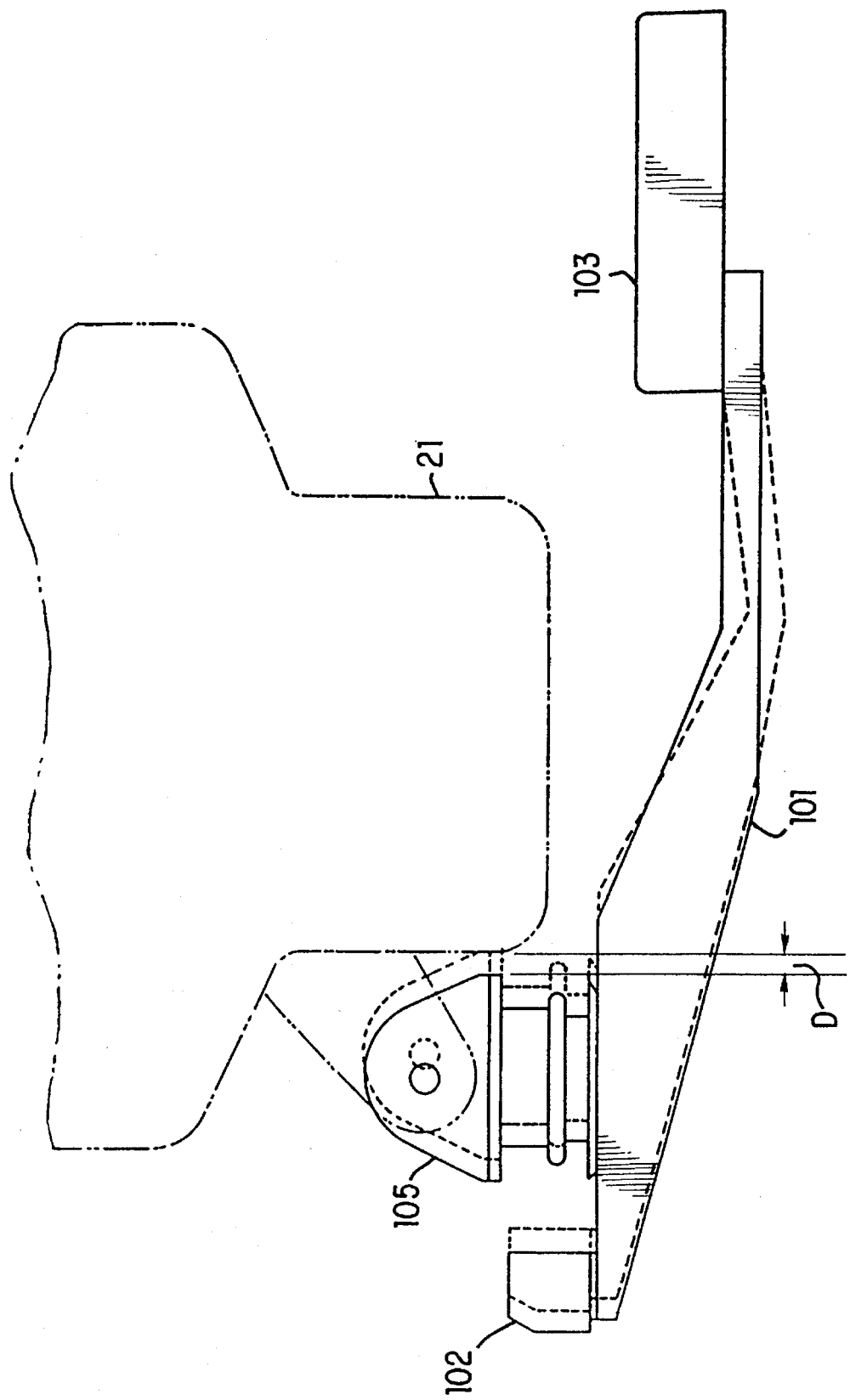
FIG. 1 is, as explained above, a schematic illustration showing a prior art power plant support structure in which a center frame is used to support a power plant.
Figure 2A:
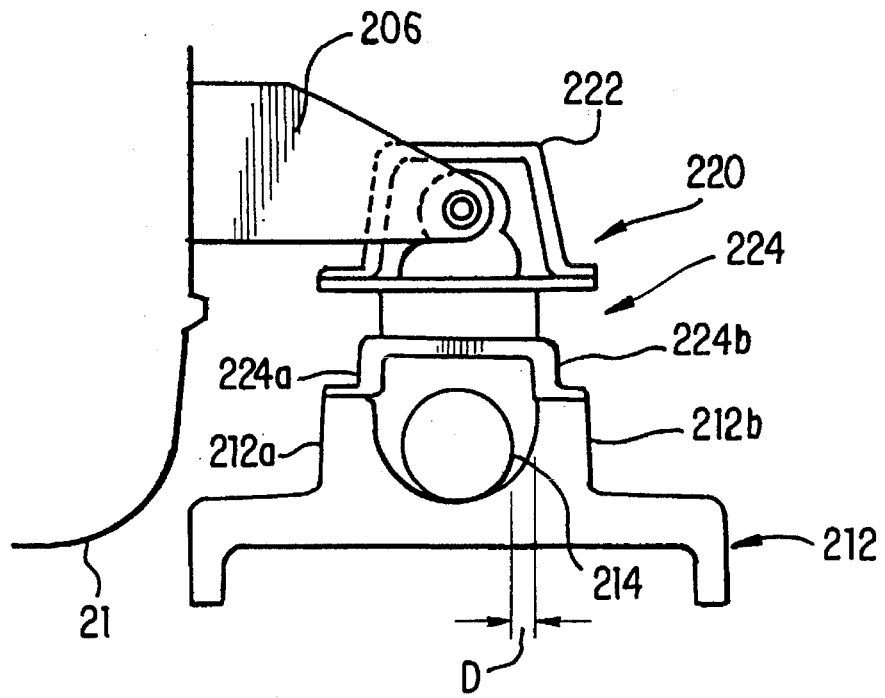
FIGS. 2A and 2B are, as explained above, side views of another prior art power plant support structure in which a rear support mount is used.
Figure 2B:
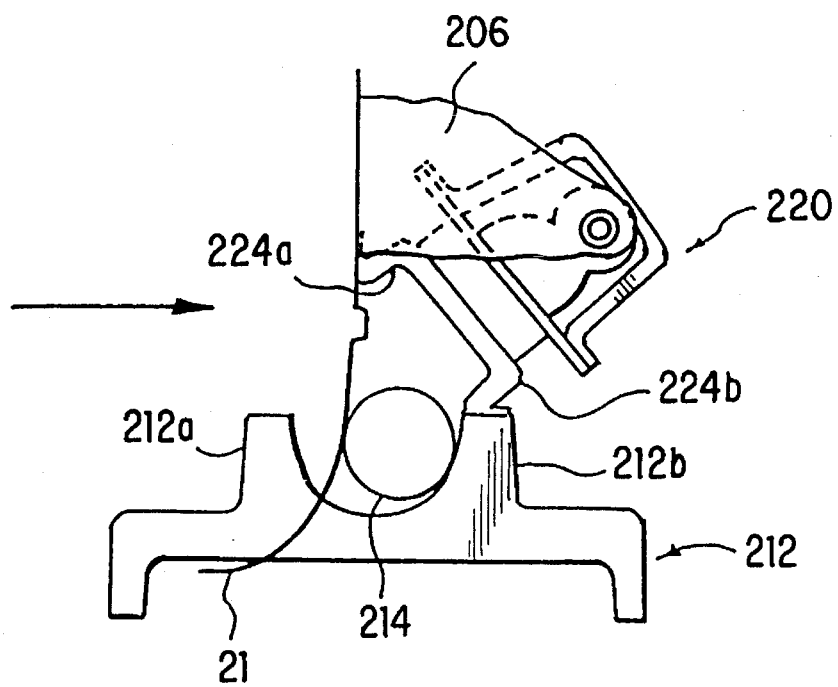
Figure 3:
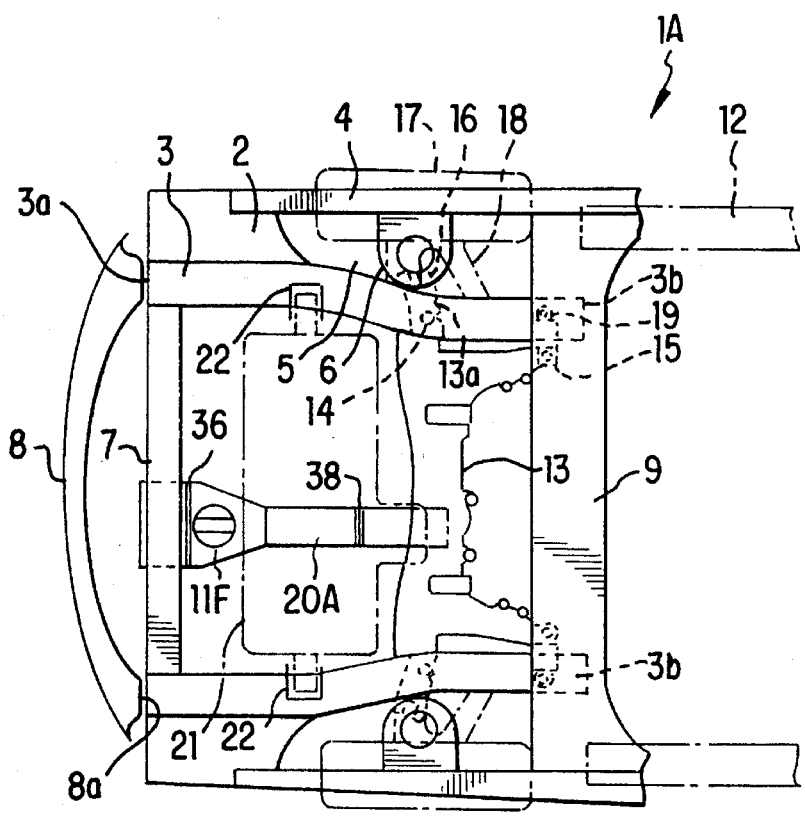
FIG. 3 is a schematic plan view of a front body section of a vehicle in which a power plant support structure in accordance with a preferred embodiment of the present invention is installed.
Figure 4:
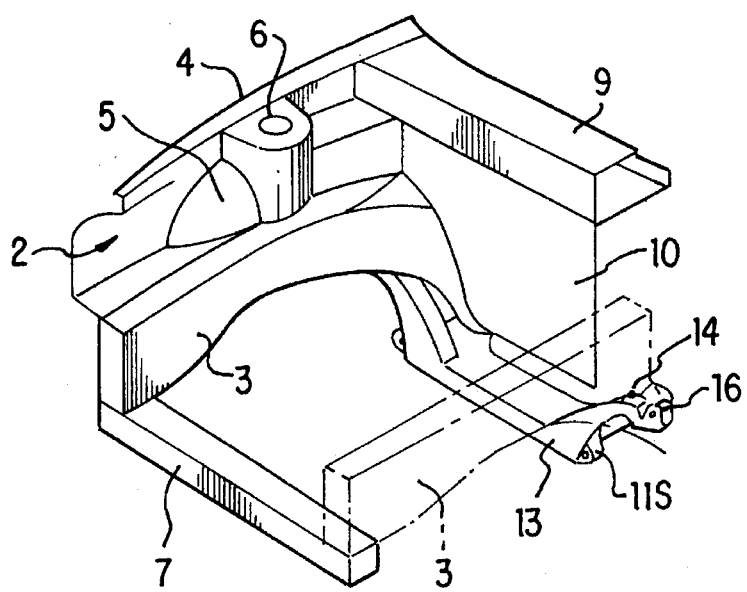
FIG. 4 is a perspective view showing part of the front body section shown in FIG. 3.

Referring to the drawings in detail and, in particular, to FIGS. 3 and 4, details of a front body section, in which a power plant support structure in accordance with a preferred embodiment of the present invention is incorporated and generally designated by a reference numeral 1A, are shown. The front body section 1A includes a pair of, i.e., left and right, front side frames 3 located on opposite sides thereof. Each front side frame 3 is welded, or otherwise secured, at its front end to a front cross member 7. Left and right wheel aprons 2 are welded or otherwise secured to the upper surfaces of the right and left front side frames 3, respectively. Each wheel apron 2 is provided with a wheel housing 5, a suspension tower 6 and a wheel apron reinforcement 4, all of which are joined together as one unit. A bumper 8 is welded, or otherwise secured, at its opposite ends 8a to the front ends 3a of the left and right front side frames 3. A rear cross member (not shown) having a closed cross-section, which forms lower part of a lower dash panel 10, disposed under a hollow channel 9, is welded, or otherwise secured, to the rear ends 3b of the front side frames 3. The left and right front side frames 3 may extend rearward beyond the rear cross member and be welded, or otherwise secured, at their rear ends to left and right side sills 12, respectively.

A suspension cross member 13, which is made of aluminum or aluminum alloy and, therefore, is relatively light but weak in strength and rigidity, is disposed at rear part of the front body section between the left and right wheel aprons 2. The suspension cross member 13 is secured by left and right side fixing members 14 to the under surface of the left and right front side frames 3 and by left and right rear fixing means 15 to the under surfaces of the suspension cross member 13. The suspension cross member 13 has a cross member extension 13a, extending outside the front side frame 3, at each end 16 for supporting a link of a suspension (not shown). The suspension cross member 13 is further provided with a connection member 11S, located near each side fixing member 14, for connecting a front arm of an A-type suspension arm 18 for suspending a front wheel 17, and a connecting member 19, located near each rear fixing member 15, for connecting a rear arm of the A-type suspension arm 18.

The suspension cross member 13 is used both to mount thereon left and right front suspension mechanisms, including the A-type suspension arms 18, a shaft member, such as a steering rack, and a power steering mechanism to support a power train 21, including an engine and a transmission (both of which are not shown), by the aid of a mount bracket 11F secured to a center frame 20A.

Figure 5:
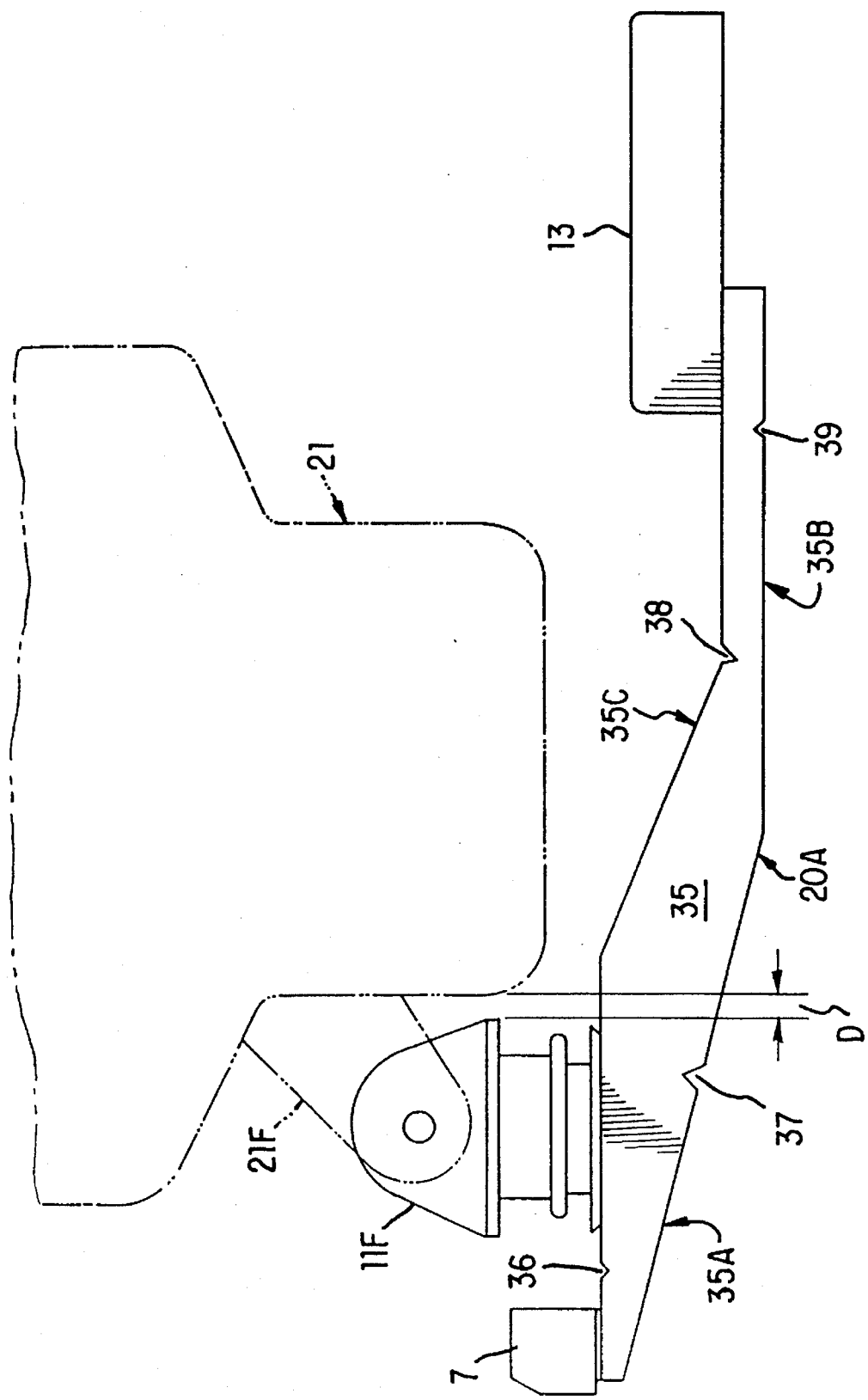
FIG. 5 is a side view of the power plant support structure in accordance with a preferred embodiment of the present invention.

The center frame 20A is disposed, in the lengthwise direction, at the mid portion of the front body section between the front cross member 7 and the suspension cross member 13. As is shown in FIG. 5, the center frame 20A, generally shaped in a form of a open-ended kick-down frame 35, fixedly mounts the mount bracket 11F for holding a front bracket 21F extending forward from the power train 21.

Referring to FIGS. 6A and 6B, the kick-down center frame 35 comprises a front frame portion 35A and a rear frame portion 35B, having a width smaller than that of the front frame portion 35A and joined to the front frame portion 35A by a transitional frame portion 35C. The frame portions 35A, 35B and 35C are integrally formed as a whole and have a closed, generally rectangular cross-section. The kick-down center frame 35 is provided with a cross member securing member 34C welded to the upper surface of a front end 35a of the front frame portion 35A and a suspension member securing section 34S welded to the upper surface of a rear end 35b of the rear frame portion 35B.

The kick-down center frame 35 is provided with what is called, in this specification, "crush pattern control means" for determining the pattern of deformation of the kick-down center frame 35 when the kick-down center frame 35 is crushed during a front-end collision of the vehicle. The crush pattern control means comprises a plurality of, for instance, four in this embodiment, generally V-shaped grooves 36–39 formed in upper and lower walls 35U and 35L of the kick-down center frame 35. The number of V-shaped grooves is determined according to a theoretically designed pattern of deformation. Every other V-shaped groove 36 and 38 or 37 and 39 is formed in one and the same wall 35U or 35L of the kick-down center frame 35. That is, the first or foremost V-shaped groove 36 is formed in the upper wall 35U of the front frame section 35A; the second V-shaped groove 37 is formed in the lower wall 35L between the front and transitional frame sections 35A and 35C; the third V-shaped groove 38 is formed in the upper wall 35U between the rear and transitional frame sections 35B and 35C; and the last V-shaped groove 39 is formed in the lower wall 35L of the rear frame section 35B. It is preferred to locate two of the V-shaped grooves 36–39 on opposite sides of the mount bracket 35 and to form the forward one of the two grooves in the upper wall 35U and the other groove in the lower wall 35L. The V-shaped grooves 36–39 have a bottom angle of approximately 90 degrees. The second V-shaped groove 37 is deeper than all of the others, which may have the same depth. In this embodiment, the second V-shaped groove 37 has a depth twice as great as the first, third and fourth V-shaped grooves 36, 38 and 39, which are all equal in depth.

Upon a front-end collision, the center frame 35, when receiving an external load through the front cross member 7, crushes and is deformed up and down in turns or in zigzags, as is shown in FIG. 7. Such a zigzag deformation of the center frame 35 provides an effective crash space which is considerably larger than the distance D between the mount bracket 35 and the power plant 21, so as to effectively absorb an impact exerted thereon and, furthermore, to suppress the rearward movement of the power plant 21. This prevents the passenger room from being damaged.

Figure 8:
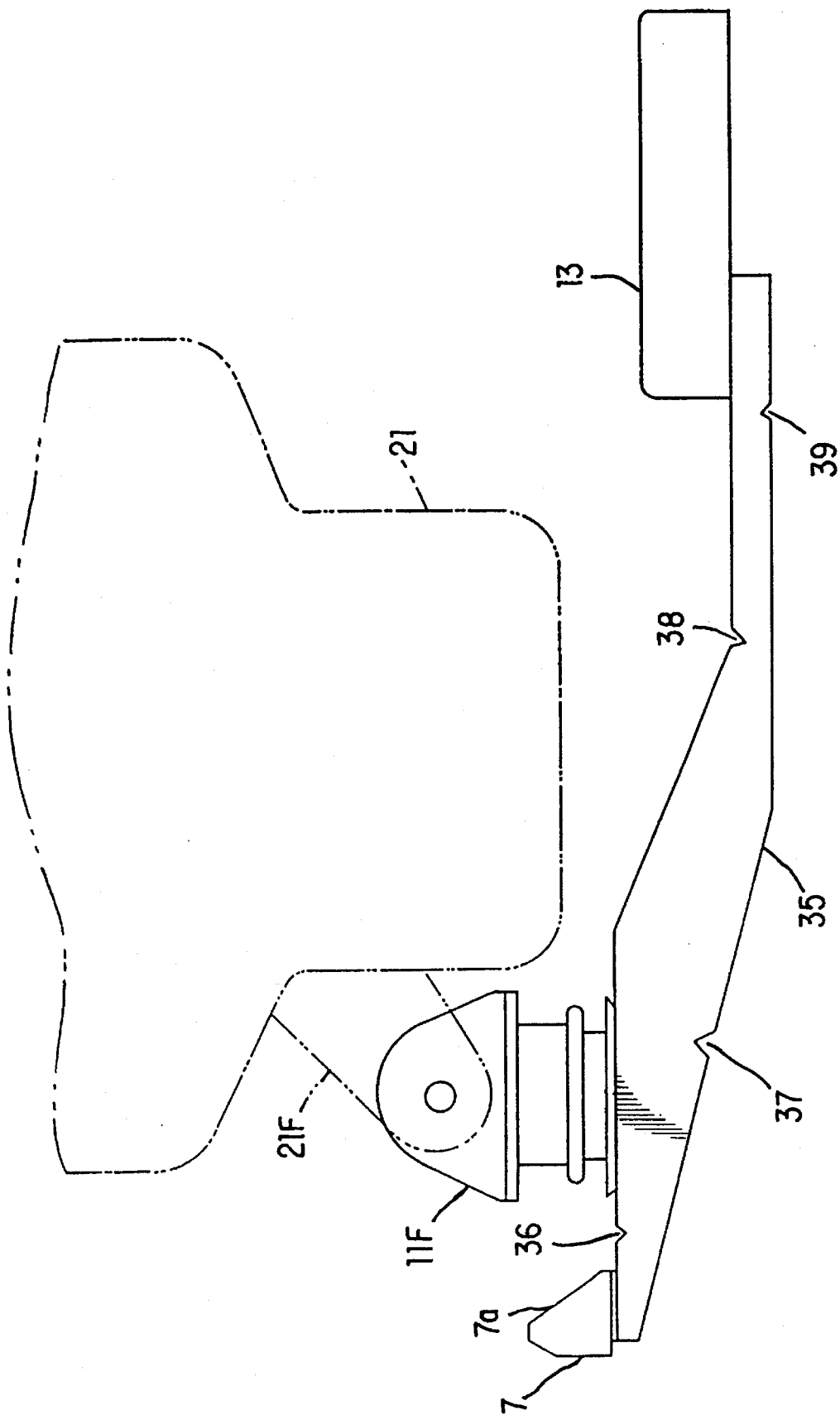
FIG. 8 is a side view of a variant of the power plant support structure shown in FIG. 5.

In order to make the effective crash space larger, it is preferable to form the front cross member 7 with a tapered rear wall 7a facing the mount bracket 35 as is shown in FIG. 8.

Figure 9:
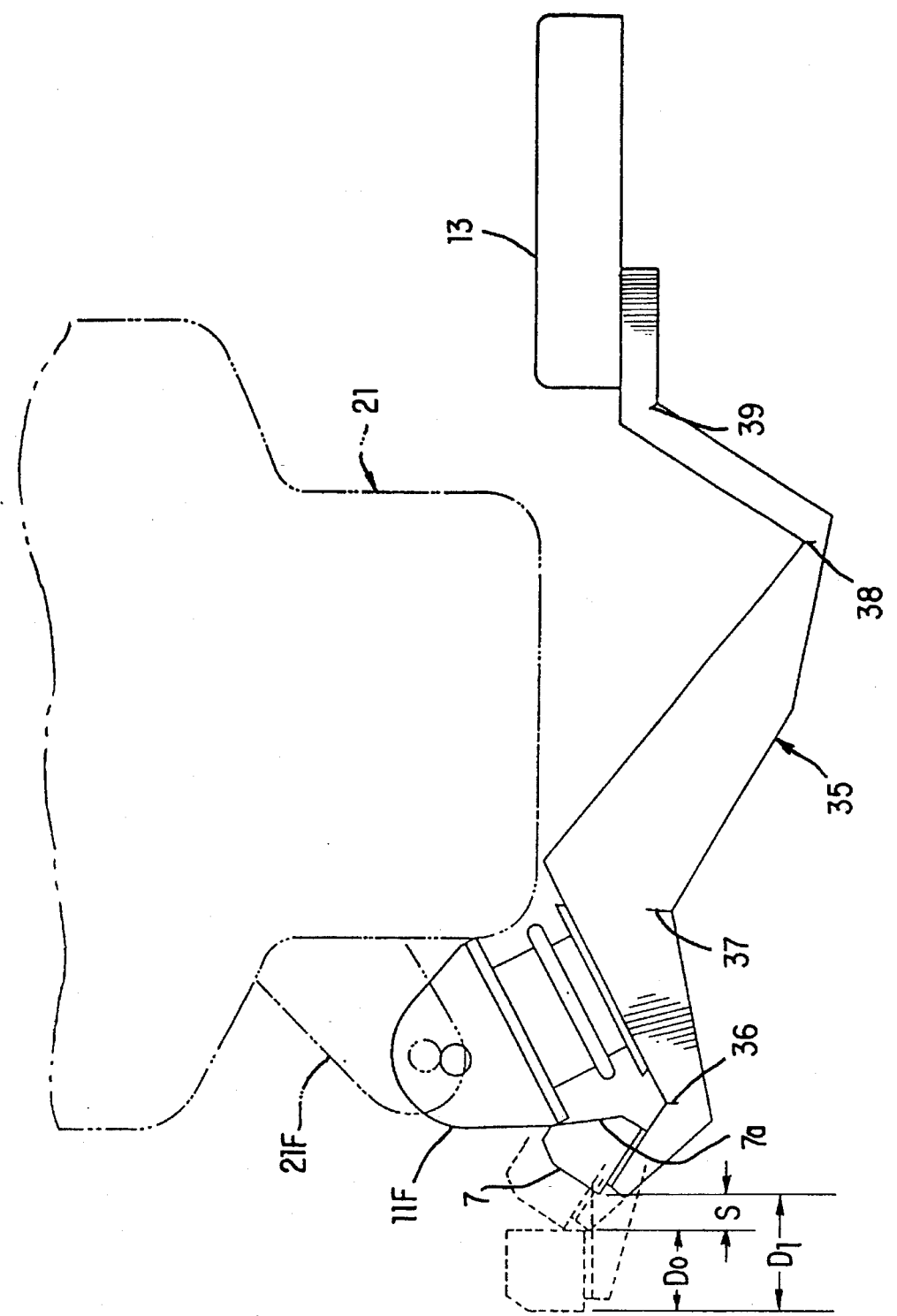
FIG. 9 is a schematic illustration of the center frame of the power plant support structure shown in FIG. 8 which has been crushed due to a front-end collision of the vehicle.

The front cross member 7, formed with the tapered rear wall 7a, allows the center frame 35 to crush rearward primarily along the first V-shaped groove 36. Accordingly, as is shown in FIG. 9, the crush distance D1 of the front end of the center frame 35 is made larger, by a distance S, than the crush distance Do which is allowed by a front cross member with no tapered rear wall.

Figure 10:
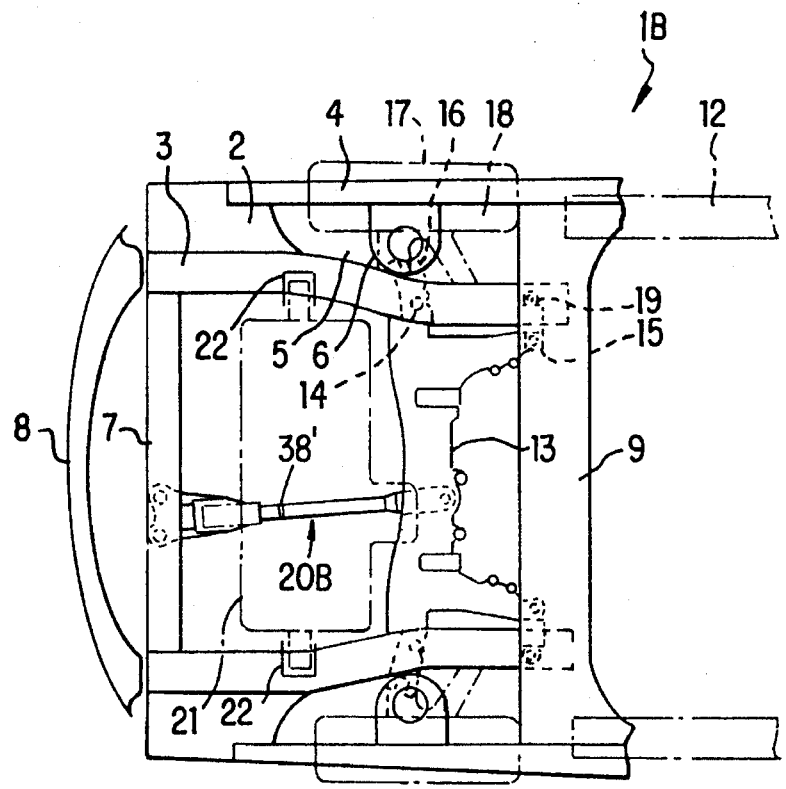
FIG. 10 is a schematic plan view of a front body section of a vehicle in which a power plant support structure in accordance with another preferred embodiment of the present invention is installed.

Referring to FIG. 10, details of a front body section, in which a power plant support structure in accordance with another preferred embodiment of the present invention is incorporated and generally designated by a reference numeral 1B, are shown. Because almost all of the elements of the power plant support structure 1B are the same as those of the power plant support structure 1A shown in FIGS. 3 and 4, except for the provision of a center frame 20B rather than center frame 20A, the following description is directed to the center frame 20B.

Figure 11:
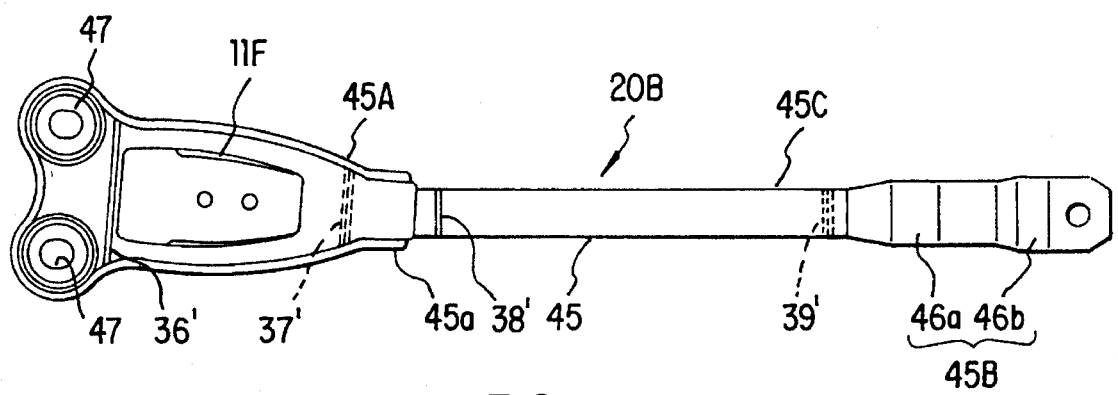
FIG. 11 is a plan view of a center frame of the power plant support structure shown in FIG. 10.
Figure 12:
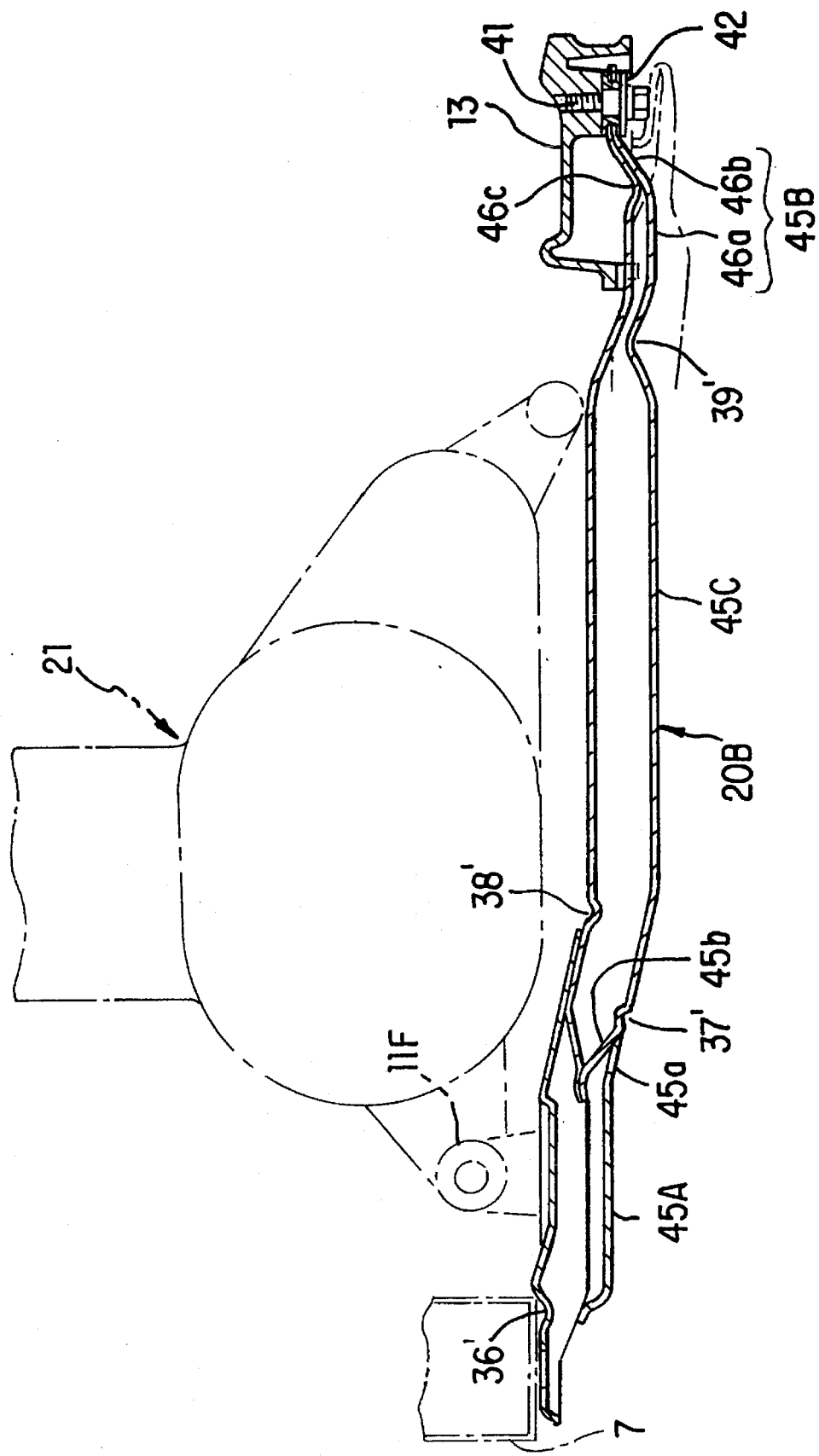
FIG. 12 is a cross-sectional view of the center frame of the power plant support structure shown in FIG. 10.
Figure 13:
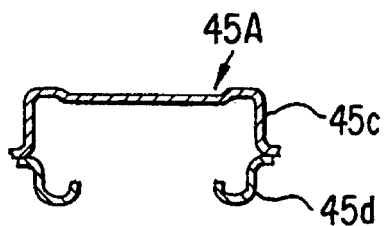
FIG. 13 is a sectional view of a rear end portion of the center frame.

As is shown in detail in FIGS. 11 and 12, the center frame 20B is generally shaped in a form of a kick-down frame 45 and is disposed in the lengthwise direction at the mid portion of the front body section 1 between the front cross member 7 and the suspension cross member 13.

The kick down frame 45 comprises a front frame portion 45A, an intermediate frame portion 45C and a rear frame portion 45B. The front frame portion 45A, shaped roughly triangularly and elongated in the lengthwise direction, is formed by an upper wall 45C made of a U-shaped steel frame and a pair of side walls 45d welded to the upper wall.

The intermediate frame portion 45C and rear frame portion 45B, integrally formed as a unit, are made of steel pipe, have a closed, generally rectangular cross-section and a width smaller than that of the front frame portion 45A. The front end portion 45b of the intermediate frame portion 45C is installed in and welded to the rear end portion 45a of the front frame portion 45A. The front frame portion 45A is formed at its front end with holes 47 through which bolts are inserted for securing the center frame 20B to the front cross member 7. A front mount 11F is mounted on the front frame portion 45A for supporting the power train 21.

The rear frame portion 45B is partially crushed so as to form a front section 46a of elliptical cross-section having a weakened rigidity and also partially flattened to form a flat rear section 46b weakened more than the elliptical front section 46a. The rear frame portion 45B is provided with a crush means in a form of a concave groove 46c formed therein between the elliptical front section 46a and the flat rear section 46b. The rear frame portion 45B is secured at the flat rear section 46b with the suspension cross member 13 by bolts 41 through a rubber bush 42.

In the power plant support structure, although the suspension cross member 13 is made of aluminum or aluminum alloy and, therefore, is relatively weak in strength and rigidity, the center frame 20B, extending between the front cross member 7 and the suspension cross member 13, sufficiently reinforces the suspension cross member 13.

Upon a front-end collision, the center frame 20B receives a external impact through the front cross member 7. When the external impact is too large, the rear frame portion 45B of the kick down frame 45 crushes first along the concave groove 46c. Then, the flat rear section 46b and the elliptical front section 46a, in order, are deformed. As a result, the deformation of the rear frame portion 45B of the kick down frame 45 greatly reduces an impact exerted on the suspension cross member 13. In particular, a large deformation of the rear frame portion 45B of the kick-down frame 45, along the concave groove 46c, allows the power plant 21 to move rearward, free from the suspension cross member 13. During this rearward movement, the power plant 21, because of its large mass, largely absorbs an impact caused by a front-end collision.

Figure 14:
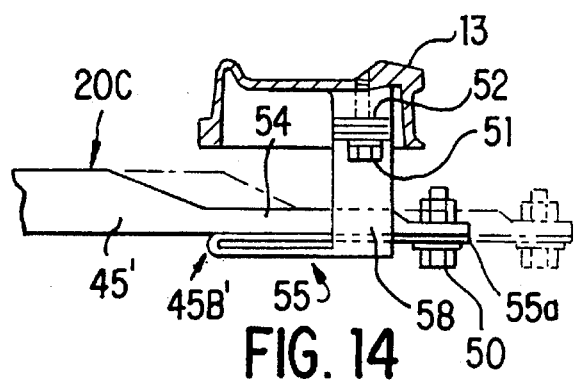
FIG. 14 is an illustration of a connecting structure between the center frame and a rear cross member.
Figure 15:
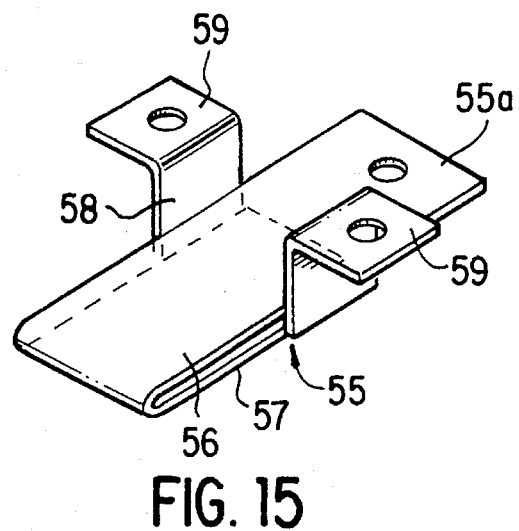
FIG. 15 is a perspective view of a connecting member used in the connecting structure shown in FIG. 14.

Referring to FIGS. 14 and 15, showing a rear part of a center frame 20C which is a variant of the center frame 20B in accordance with the previous embodiment shown in FIGS. 10 to 13, the rear frame portion 45B' of the kick-down frame 45' has a flat tail section 54 having a rigidity lower than that of the remaining portion of the kick-down frame 45'. A generally U-shaped connecting member 55, which serves as a means for absorbing an impact exerted on the suspension cross member 13 through the front cross member 7, is secured to the flat tail section 54 of the rear frame portion 45B' by a bolt 50. This generally U-shaped connecting member 55 comprises an upper base plate 56, in contact with the under surface of the flat tail section 54, a lower base plate 57, which is provided by folding the upper base plate 56 rearward and down and extends mid-way along the upper base plate 56, and a pair of legs 58, with flanges 59, extending upward from opposite side edges of the lower base plate 57. As is clearly shown in FIG. 14, the generally U-shaped connecting member 55 is bolted at its rear end 55a of the upper base plate 56. The suspension cross member 13 is secured to the flanges 59 of the generally U-shaped connecting member 55 by bolts 51 through rubber bushes 52.

Because the generally U-shaped connecting member 55 has upper and lower base plates 56 and 57 which are integral and folded and connected to different members, namely, the center frame 20C and the suspension cross member 13, respectively, the generally U-shaped connecting member 55, upon a front-end collision of the vehicle, deforms in a way which allows the upper base plate 56 to move rearward. Consequently, the generally U-shaped connecting member 55 absorbs an impact exerted on the center frame 20C during its own deformation.

As is shown in FIGS. 10–12, the center frame 20B may be formed with a plurality of V-shaped grooves 36'–39' in the same manner as in the previous embodiment. The V-shaped grooves 36'–39' allow the center frame 20B to crush or be deformed up and down in turns or in zigzags upon a front-end collision. Such a zigzag deformation of the center frame 20B provides an increased crush space in the power plant support structure 1B.

Figure 16:
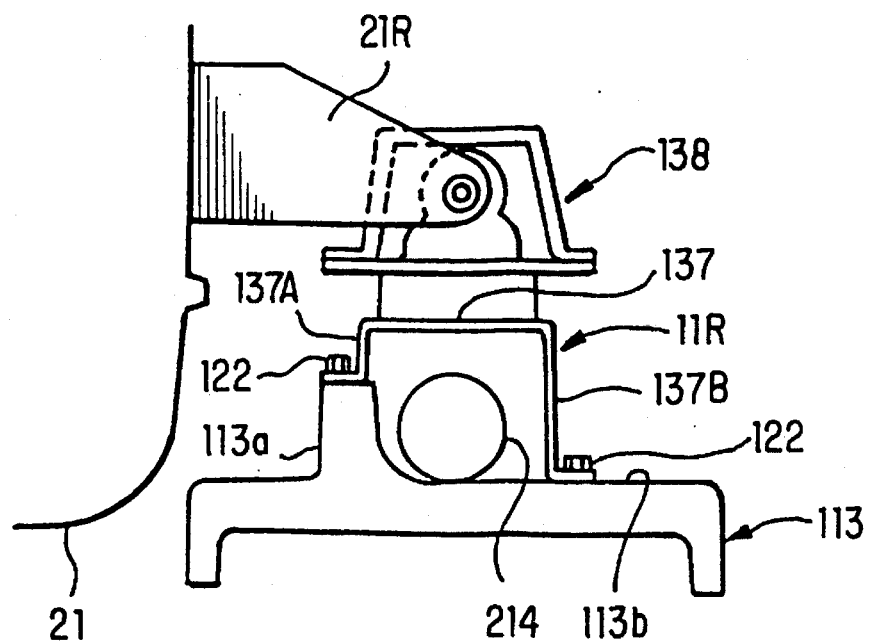
FIG. 16 is a schematic side view of a power plant support structure in accordance with still another preferred embodiment of the present invention which is disposed rearward of a power plant.
Figure 17:
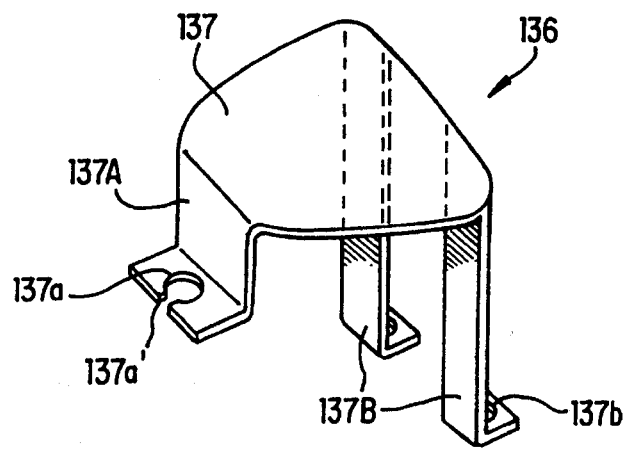
FIG. 17 is a perspective view of a mount member used in the power plant support structure shown in FIG. 16.

Referring to FIGS. 16 and 17, a power plant support structure in accordance with another preferred embodiment of the present invention, which is mounted on a suspension cross member, is shown. The power plant support structure comprises a suspension cross member 113 and a rear support bracket 11R. The suspension cross member 113, extending from side to side of the vehicle behind a power plant 21, is formed with a mounting post 113a. A steering rack 214 extends in the transverse direction behind the mounting post 113a over the suspension cross member 113. The rear support bracket 11R comprises a mount body 137 and a mounting head 138 secured onto the mount body 137. The mount body 137, as is shown in detail in FIG. 17, has a front leg 137A and a pair of rear legs 137B, greater in length than the front leg 137A. The front leg 137A is formed with a screw hole 137a with a slit 137a' opening forward. Each rear leg 137B is formed with a screw hole 137b. The mount body 137 is attached to the suspension cross member 113 in such a way as to fasten, with set screws 122, the short leg 137A to the post 113a and the long legs 137B to a rear flat portion 113b of the suspension cross member 113 defined the steering rack 214. The mounting head 138 is connected to a U-shaped rear bracket 21R extending from the power plant 21. The rear flat section 113b of the suspension cross member 113 allows the steering rack 214 to displace rearward.

Figure 18A:
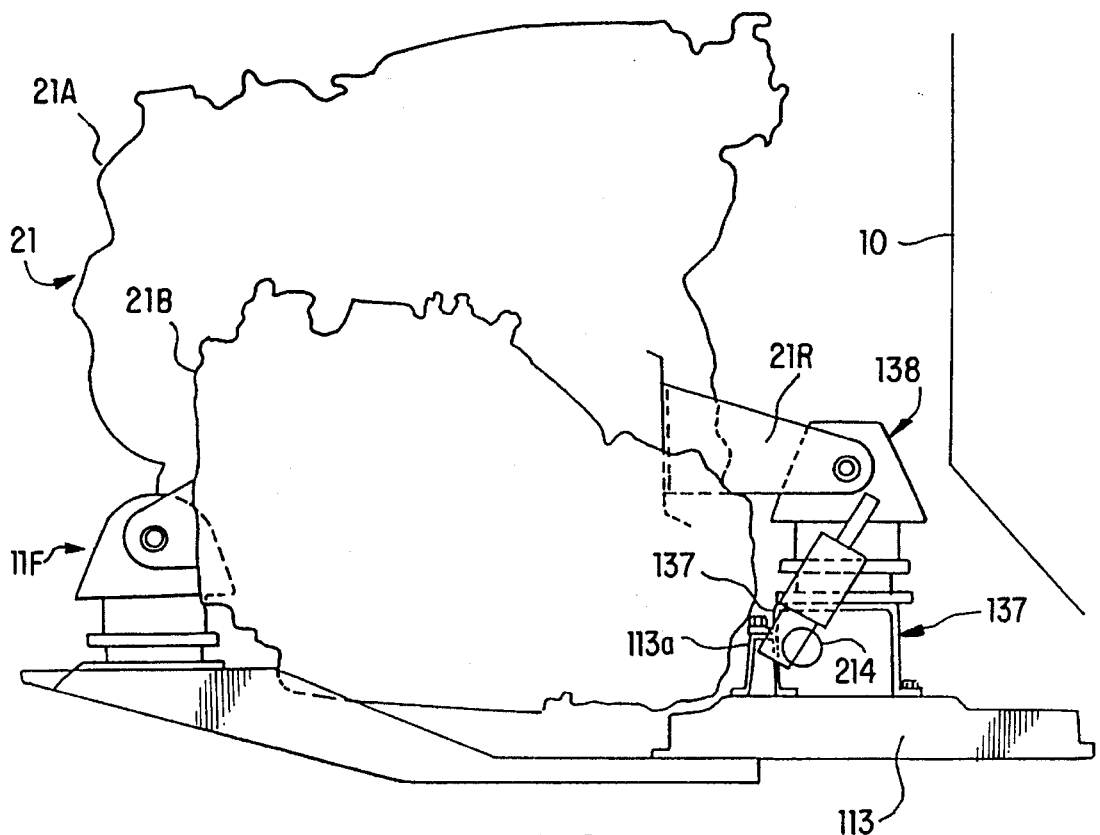

As is shown in detail in FIGS. 18A and 18B, the power plant 21, including an engine 21A and a transmission 21B, is supported at its front end by a front support bracket 11F and at its opposite sides by side support brackets 11S as well as at its rear end by the rear support bracket 11R. The U-shaped rear bracket 21R is secured by bolts 144 to the mid-portion of the power plant 21 in the transverse direction. The mounting post 113a may be welded or otherwise secured to the mid-portion of the suspension cross member in the transverse direction, or may be formed integrally with the suspension cross member 113.

Figure 19:
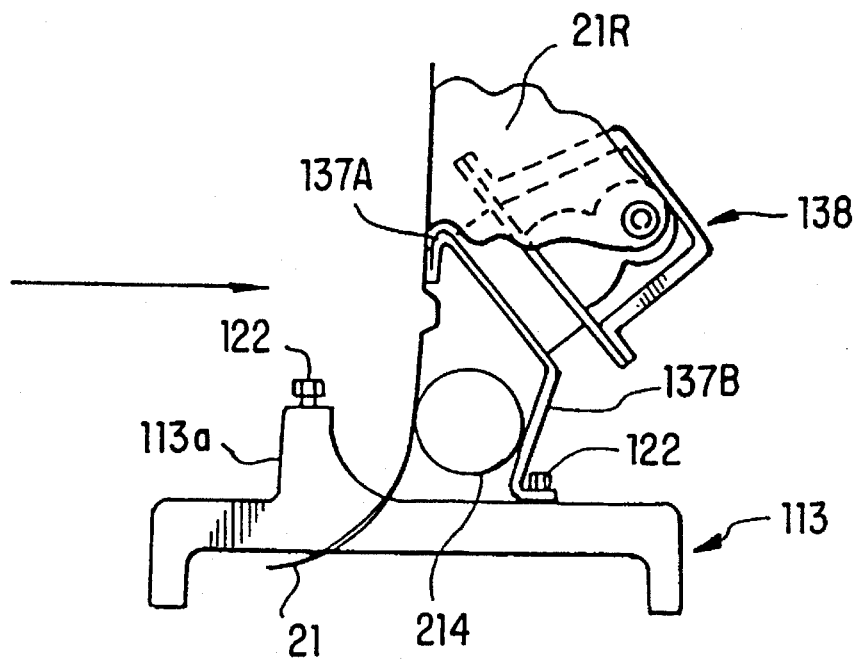
FIG. 19 is an illustration showing a deformed condition of the mount member.

Referring to FIG. 19, when the vehicle receives an external load or impact upon an occurrence of a collision, such as a front-end collision, the power plant 21 is forced rearward and possibly crushes against the steering rack 214. The steering rack 214, because it is not prevented from moving rearward by the suspension cross member 113, is moved or displaced rearward together with the power plant 21 until the external impact is fully absorbed during the front-end collision. When the steering rack 214 crashes against the rear legs 137B, the front leg 137A is detached from the set screw 122 through the slit 137a' so as to allow the mount body 137 to bend and deform rearward. The rearward deformation of the mount body 137 allows the power plant 21 and the steering rack 214, as a whole, to move rearward. Accordingly, the power plant support structure, thus constructed, provides a crash absorbing structure with increased capacity.

Although the mount body 137 of the rear bracket 11F is provided with rear legs 137B, which are great in length so as to reach the flat portion 113b of the suspension cross member 113, the front leg 137A is made small in length, so as to provide the rear bracket 11R with structural rigidity sufficient to support the power plant. This is because almost all the weight of the power plant 21 exerted on the rear bracket 11R is received by a front half of the rear bracket 11R. Therefore, a weakness in the rear half of the rear bracket 11R does not adversely affect the rigidity of the power plant support.

It is to be understood that although the present invention has been described in detail with respect to preferred embodiments thereof, various other embodiments and variants which fall within the scope and spirit of the invention may occur to those skilled in the art. Such other embodiments and variants are intended to be covered by the following claims.

What is claimed is:

1. A support structure for a power plant, installed in an engine room, defined by a pair of front side frames disposed on opposite sides of the engine room, a front cross member disposed in front of the power plant and extending between and connected to the front side frames, and a rear cross member disposed rearward of the power plant and extending between and connected to the front side frames, comprising:

a center frame having lengthwise ends and extending in a lengthwise direction of the vehicle, from front to back, between and connected at said lengthwise ends to the front and rear cross members;

mount means, secured to said center frame, for connecting the power plant to said center frame;

connecting means for connecting a rear end of said center frame to said rear cross member; and impact absorbing means, providing a connection between said center frame and said rear cross member which is deformable in the lengthwise direction upon a front-end collision of the vehicle, for absorbing an impact exerted on said rear cross member by said center frame.

2. A power plant support structure as recited in claim 1, wherein said impact absorbing means comprises a deformable folded member, one part of which is connected to a rear end of said center frame and another part of which is connected to said rear cross member.

3. A power plant support structure as recited in claim 1, wherein said rear cross member comprises a suspension cross member.

4. A power plant support structure as recited in claim 1, wherein said impact absorbing means comprises a rear end portion of said center frame which is weaker than remaining portions of said center frame.

5. A power plant support structure as recited in claim 4, wherein said center frame comprises an elongated hollow member and wherein said rear end portion is crushed flat.

6. A power plant support structure as recited in claim 5, wherein said impact absorbing means further comprises a groove, extending transversely relative to the lengthwise direction and formed in said center frame adjacent to said rear end portion.

7. A power plant support structure as recited in claim 4, wherein said rear cross member comprises a suspension cross member.

* * * * *